(12) United States Patent
Takaki (10) Patent No.: US 12,394,211 B2
(45) Date of Patent: Aug. 19, 2025

(54) TARGET RECOGNITION DEVICE (71) Applicant: DENSO CORPORATION, Kariya (JP)

(72) Inventor: Masanari Takaki, Kariya (JP)

(73) Assignee: DENSO CORPORATION, Kariya (JP)

(*) Notice: Subject to any disclaimer, the term of this patent is extended or adjusted under 35 U.S.C. 154(b) by 449 days.

(21) Appl. No.: 17/821,131

(22) Filed: Aug. 19, 2022

(65) Prior Publication Data

US 2022/0392230 A1 Dec. 8, 2022

Related U.S. Application Data (63) Continuation of application No. PCT/JP2021/005661, filed on Feb. 16, 2021.

(30) Foreign Application Priority Data

Feb. 21, 2020 (JP) ................. 2020-028459

(51) Int. Cl.
G06V 20/58 (2022.01)
G06V 10/28 (2022.01)
G06V 20/56 (2022.01)

(52) U.S. Cl.
CPC .............. *G06V 20/58* (2022.01); *G06V 10/28* (2022.01); *G06V 20/588* (2022.01); *G06V 2201/07* (2022.01)

(58) Field of Classification Search
CPC ...... G06V 20/58; G06V 10/28; G06V 20/588; G06V 2201/07
See application file for complete search history.

(56) References Cited

U.S. PATENT DOCUMENTS

| 10,140,530 | B1* | 11/2018 | Jagannath | G06V 20/588 |
| 10,496,891 | B2* | 12/2019 | Sai | G08G 1/16 |
| 2008/0247651 | A1* | 10/2008 | Takaki | G06V 20/582 382/219 |
| 2015/0103173 | A1* | 4/2015 | Takaki | B60R 11/04 348/148 |

(Continued)

OTHER PUBLICATIONS

A. Polychronopoulos, M. Tsogas, A. J. Amditis and L. Andreone, "Sensor Fusion for Predicting Vehicles' Path for Collision Avoidance Systems," in IEEE Transactions on Intelligent Transportation Systems, vol. 8, No. 3, pp. 549-562, Sep. 2007, doi: 10.1109/TITS.2007.903439. (Year: 2007).*

(Continued)

*Primary Examiner* — Gregory A Morse
*Assistant Examiner* — Ronde Lee Miller
(74) *Attorney, Agent, or Firm* — Maschoff Brennan (57) ABSTRACT A target recognition device includes a roadside object determination unit, a coordinate calculation unit, a road boundary estimation unit, a distance calculation unit, and a likelihood increasing unit. The roadside object determination unit determines whether a target has a feature of a roadside object. The coordinate calculation unit calculates a coordinate in a lateral direction of the target. The road boundary estimation unit estimates a road boundary. The distance calculation unit calculates a distance from the target to the road boundary. The likelihood increasing unit increases a likelihood that the target is a roadside object, on condition that the distance is a preset threshold value or less.

2 Claims, 7 Drawing Sheets (56) References Cited

U.S. PATENT DOCUMENTS

| | | | | |
|---|---|---|---|---|
| 2015/0258936 A1* | 9/2015 | Takaki | ............... | H04N 23/698 |
| | | | | 348/148 |
| 2019/0180117 A1* | 6/2019 | Okada | ................. | G01S 13/931 |
| 2021/0004610 A1* | 1/2021 | Huang | ................... | G01S 17/10 |
| 2022/0227395 A1* | 7/2022 | Aoki | ....................... | G01S 17/93 |
| 2022/0289245 A1* | 9/2022 | Kuriyama | ...... | B60W 60/00186 |
| 2022/0392230 A1* | 12/2022 | Takagi | ............. | G06V 10/28 |

OTHER PUBLICATIONS

L. Hammarstrand, M. Fatemi, Á. F. García-Fernández and L. Svensson, "Long-Range Road Geometry Estimation Using Moving Vehicles and Roadside Observations," in IEEE Transactions on Intelligent Transportation Systems, vol. 17, No. 8, pp. 2144-2158, Aug. 2016, doi: 10.1109/TITS.2016.2517701. (Year: 2016).*

* cited by examiner

TARGET RECOGNITION DEVICE

CROSS-REFERENCE TO RELATED APPLICATION

The present application is based on and claims the benefit of priority from earlier Japanese Patent Application No. 2020-028459 filed on Feb. 21, 2020, the description of which is incorporated herein by reference.

BACKGROUND

Technical Field

The present disclosure relates to a target recognition device.

Related Art

A roadside object recognition device is disclosed. The roadside object recognition device includes a radar and a camera. The roadside object recognition device acquires a reflection point group by using the radar. The roadside object recognition device uses images of the camera to specify a reflection point highly likely not to be a reflection point of a roadside object. The roadside object recognition device excludes the reflection point highly likely not to be a reflection point of a roadside object from the reflection point group. The roadside object recognition device uses the reflection point group after the exclusion to recognize the roadside object.

SUMMARY

An aspect of the present disclosure is a target recognition device, including: a traveling path estimation unit configured to estimate a future traveling path of a vehicle based on a speed and a yaw rate of the vehicle; a target detection unit configured to detect a target present ahead of the vehicle by using a sensor; a roadside object determination unit configured to determine whether the target detected by the target detection unit has a feature of a roadside object; a coordinate calculation unit configured to calculate a coordinate in a lateral direction of the target determined to have the feature of the roadside object; a road boundary estimation unit configured to estimate a road boundary based on the coordinate in the lateral direction; a fixed object determination unit configured to determine whether the target detected by the target detection unit has a feature of a fixed object; a distance calculation unit configured to calculate a distance from the target determined to have the feature of the fixed object to the road boundary estimated by the road boundary estimation unit; and a likelihood increasing unit configured to increase a likelihood that the target is a roadside object, on condition that the distance is a preset threshold value or less.

BRIEF DESCRIPTION OF THE DRAWINGS

In the accompanying drawings:

FIG. 5 is an explanatory diagram illustrating a traveling path, a target, road boundaries, and the like;

DETAILED DESCRIPTION OF THE PREFERRED EMBODIMENTS

JP 2019-106022 A discloses a roadside object recognition device. The roadside object recognition device includes a radar and a camera. The roadside object recognition device acquires a reflection point group by using the radar. The roadside object recognition device uses images of the camera to specify a reflection point highly likely not to be a reflection point of a roadside object. The roadside object recognition device excludes the reflection point highly likely not to be a reflection point of a roadside object from the reflection point group. The roadside object recognition device uses the reflection point group after the exclusion to recognize the roadside object.

Detailed studies by the inventor found a problem that the roadside object recognition device disclosed in JP 2019-106022 A requires a radar and a camera in order to recognize a roadside object.

An aspect of the present disclosure preferably provides a target recognition device that can recognize a roadside object even when the target recognition device does not use both of two kinds of sensors.

Exemplary embodiments of the present disclosure will be described with reference to the drawings.

First Embodiment

1. Configuration of Target Recognition Device 1

Figure 1:
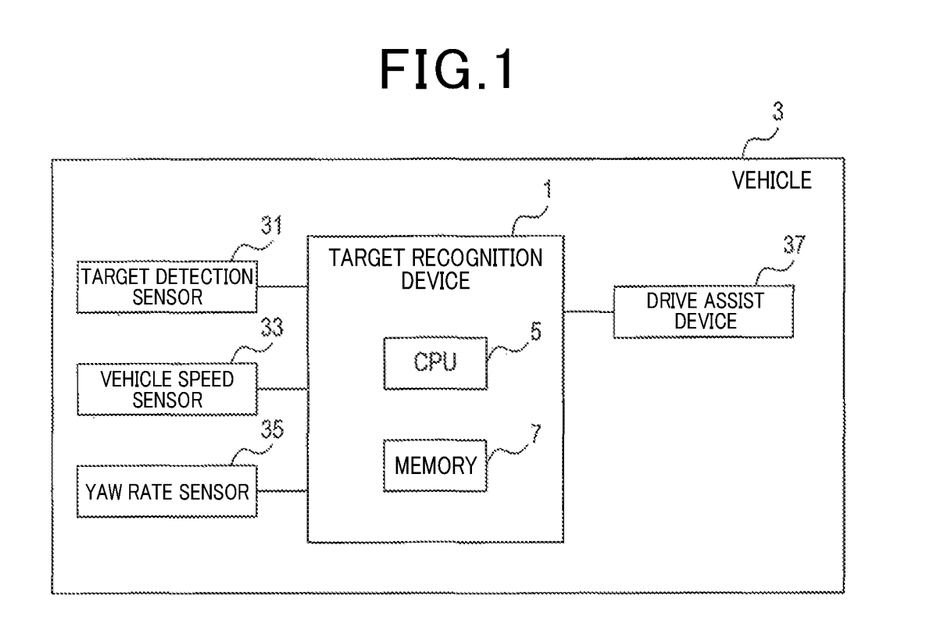
FIG. 1 is a block diagram illustrating a configuration of a target recognition device.

A configuration of the target recognition device 1 will be described with reference to FIG. 1 and FIG. 2. As illustrated in FIG. 1, the target recognition device 1 is installed in a vehicle 3. The target recognition device 1 includes a microcomputer having a CPU 5 and a semiconductor memory (hereinafter, referred to as a memory 7) such as a RAM and a ROM.

Functions of the target recognition device 1 are implemented by the CPU 5 executing a program stored in a non-transitory tangible storage medium. In this example, the memory 7 corresponds to the non-transitory tangible storage medium storing the program. Executing the program performs a method corresponding to the program. The target recognition device 1 may include one microcomputer or a plurality of microcomputers.

Figure 2:
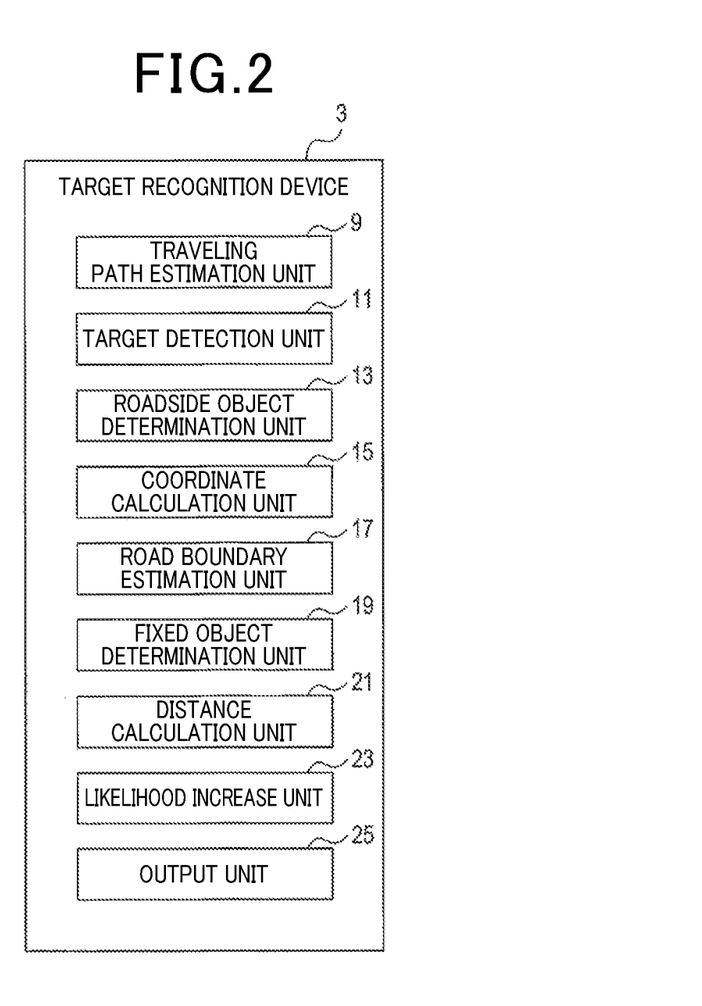
FIG. 2 is a block diagram illustrating a functional configuration of the target recognition device.

As illustrated in FIG. 2, the target recognition device 1 includes a traveling path estimation unit 9, a target detection unit 11, a roadside object determination unit 13, a coordinate calculation unit 15, a road boundary estimation unit 17, a fixed object determination unit 19, a distance calculation unit 21, a likelihood increasing unit 23, and an output unit 25.

The target recognition device 1 is connected to various members included in the vehicle 3. The members connected with the target recognition device 1 include, as illustrated in FIG. 1, a target detection sensor 31, a vehicle speed sensor 33, a yaw rate sensor 35 and a drive assist device 37.

The target detection sensor 31 is used to detect a target present ahead of the vehicle 3. The target detection sensor 31 of the first embodiment is a radar sensor. The vehicle speed sensor 33 detects a vehicle speed of the vehicle 3. The yaw rate sensor 35 detects a yaw rate of the vehicle 3. The drive assist device 37 performs drive assist for the vehicle 3 by using a roadside object likelihood described later.

2. Process Performed by Target Recognition Device 1

A process repeatedly performed by the target recognition device 1 at every predetermined time period will be described with reference to FIG. 3 to FIG. 8. Performing the processing illustrated in FIG. 3 once is defined as one cycle. In step S1 in FIG. 3, the traveling path estimation unit 9 measures a vehicle speed of the vehicle 3 by using the vehicle speed sensor 33. The traveling path estimation unit 9 measures a yaw rate of the vehicle 3 by using the yaw rate sensor 35. The traveling path estimation unit 9 estimates a future traveling path of the vehicle 3 based on the vehicle speed and the yaw rate of the vehicle 3.

Figure 5:
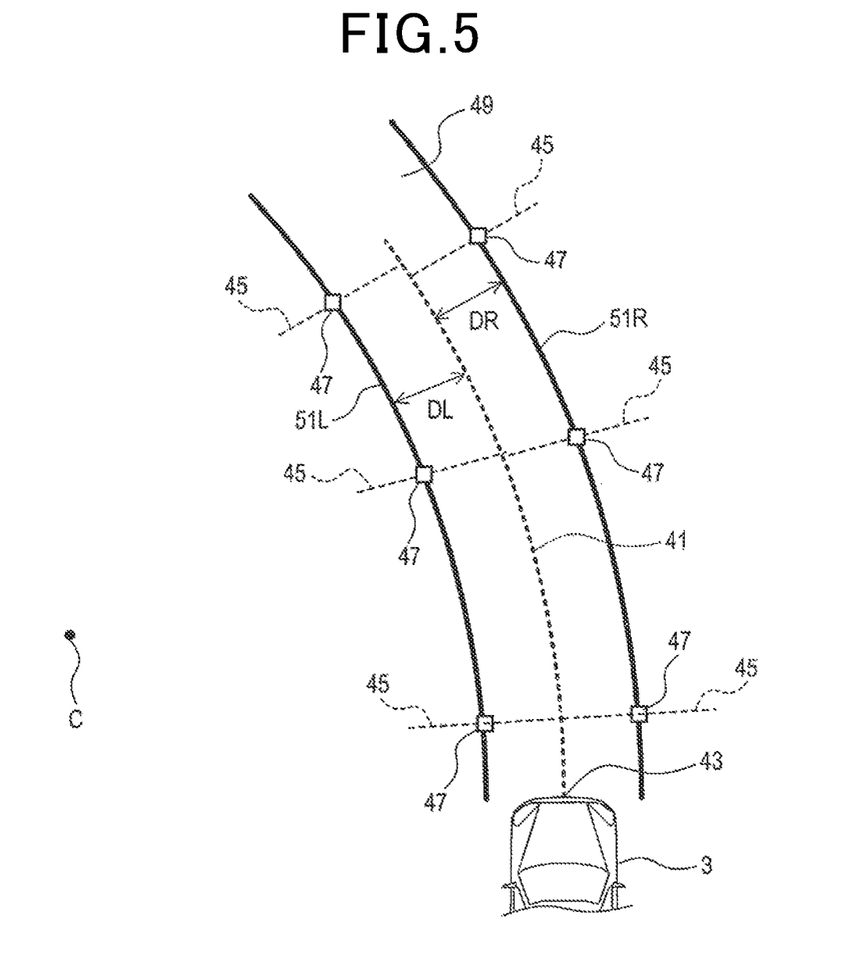

As illustrated in FIG. 5, a future traveling path 41 of the vehicle 3 is a path through which the center 43 of the front end of the vehicle 3 in the width direction is predicted to pass in the future.

Figure 3:
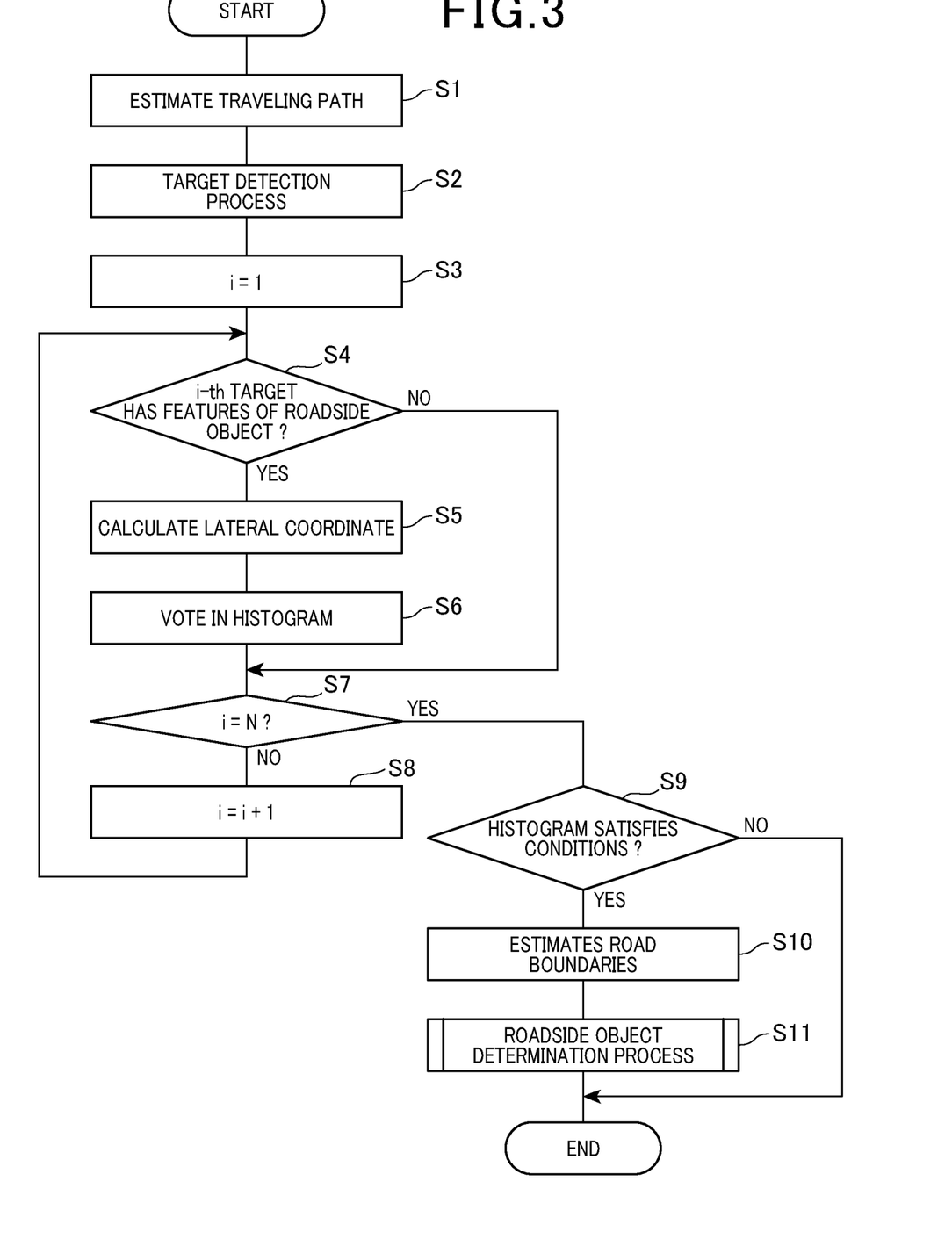
FIG. 3 is a flowchart of a process performed by the target recognition device.

In step S2, the target detection unit 11 uses the target detection sensor 31 to perform a process for detecting a target present ahead of the vehicle 3. A result of detection by the target detection sensor 31 includes, for example, a plurality of distance measurement points. Each of the distance measurement points is one reflection point of a laser beam. The target detection unit 11 collectively detects, as one target, a plurality of distance measurement points highly likely to be derived from the same target.

In step S3, the target detection unit 11 initializes i, which is a number of a target, to 1. The number of a target is a serial number assigned to a target detected in the processing of the step S2. Herein, it is assumed that N targets are detected in the processing of the step S2. N is a natural number. Any of numbers 1, 2, 3, . . . N is assigned to each target. The numbers assigned to the respective targets differ from each other.

In step S4, the roadside object determination unit 13 determines whether the target whose number is i (hereinafter, referred to as an i-th target) has features of a roadside object. The roadside object is a target that is present in the vicinity of a road boundary and is still. The road boundary is a boundary between a road and an area other than the road. The vehicle 3 cannot pass through the road boundary.

The roadside object is, for example, a delineator or a rubber pole.

Having features of a roadside object means satisfying all of the following conditions JA1 to JA4.

JA1: The target includes a high-reflection point. The high-reflection point is a measurement point having reflection intensity, which is equal to or higher than a threshold value, with respect to a laser beam.

JA2: The size of the target is a threshold value or smaller.

JA3: The absolute velocity of the target is a threshold value or lower.

JA4: The height of the target is a threshold value or more.

The roadside object determination unit 13 can calculate a height of a target based on an angle of reflected waves arriving from the highest portion of the target. A cat's eye is not a roadside object because the cat's eye is not present on a road boundary. When the target is a cat's eye, conditions JA1 to JA3 may be satisfied. However, a cat's eye does not satisfy condition JA4. Hence, the roadside object determination unit 13 can suppress determining that the cat's eye is a roadside object.

When an i-th target has features of a roadside object, the present process proceeds to step S5. When an i-th target does not have features of a roadside object, the present process proceeds to step S7.

In step S5, the coordinate calculation unit 15 calculates a lateral coordinate (a coordinate in a lateral direction) of the i-th target. The lateral coordinate is a coordinate on a coordinate axis 45 illustrated in FIG. 5. The coordinate axis 45 is orthogonal to the traveling path 41 estimated in the step S1 and passes through the i-th target. The lateral coordinate is 0 on the traveling path 41. The absolute value of the lateral coordinate is the distance between an i-th target 47 and the traveling path 41.

Figure 6:
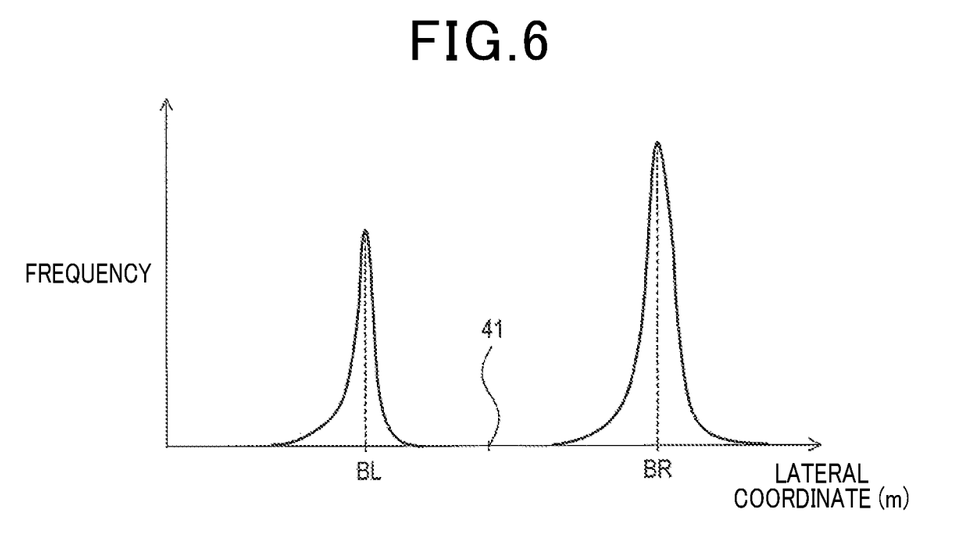
FIG. 6 is an explanatory diagram illustrating a histogram having a low standard deviation.

In step S6, the road boundary estimation unit 17 votes for the lateral coordinate of the i-th target in a histogram. As illustrated in FIG. 6, the histogram indicates, for each bin of the lateral coordinate, a frequency of the lateral coordinate belonging to the bin. Voting for the lateral coordinate of the i-th target in a histogram corresponds to preparing the histogram.

In step S7, the target detection unit 11 determines whether the number i is equal to N. If the number i is less than N, the present process proceeds to step S8. If the number i is equal to N, the present process proceeds to step S9. The number i being equal to N means that the processing of the steps S4 to S6 is completed for all the targets detected in the processing of the step S2, whereby the histogram is completed.

In step S8, the number i is incremented by 1. Then, the present process proceeds to step S4.

In step S9, the road boundary estimation unit 17 determines whether the completed histogram satisfies the following conditions JB1 and JB2.

JB1: A standard deviation of the histogram is a threshold value or less.

JB2: The frequency of a bin having a maximum frequency is a threshold value or higher.

The standard deviation corresponds to an index indicating an extent of a variation of the histogram. If JB1 and JB2 are satisfied, the present process proceeds to step S10. If JB1 or JB2 is not satisfied, the present process ends.

Figure 7:
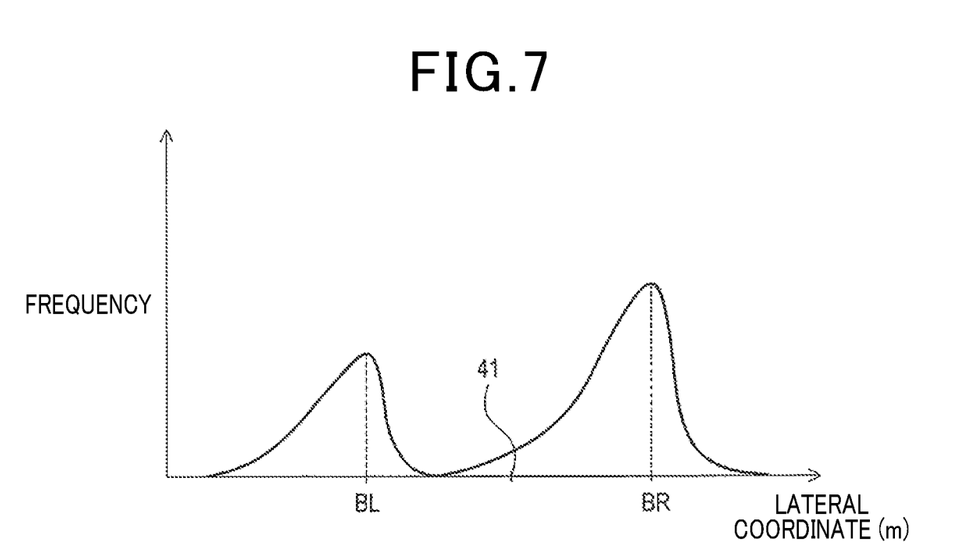
FIG. 7 is an explanatory diagram illustrating a histogram having a high standard deviation.
Figure 8:
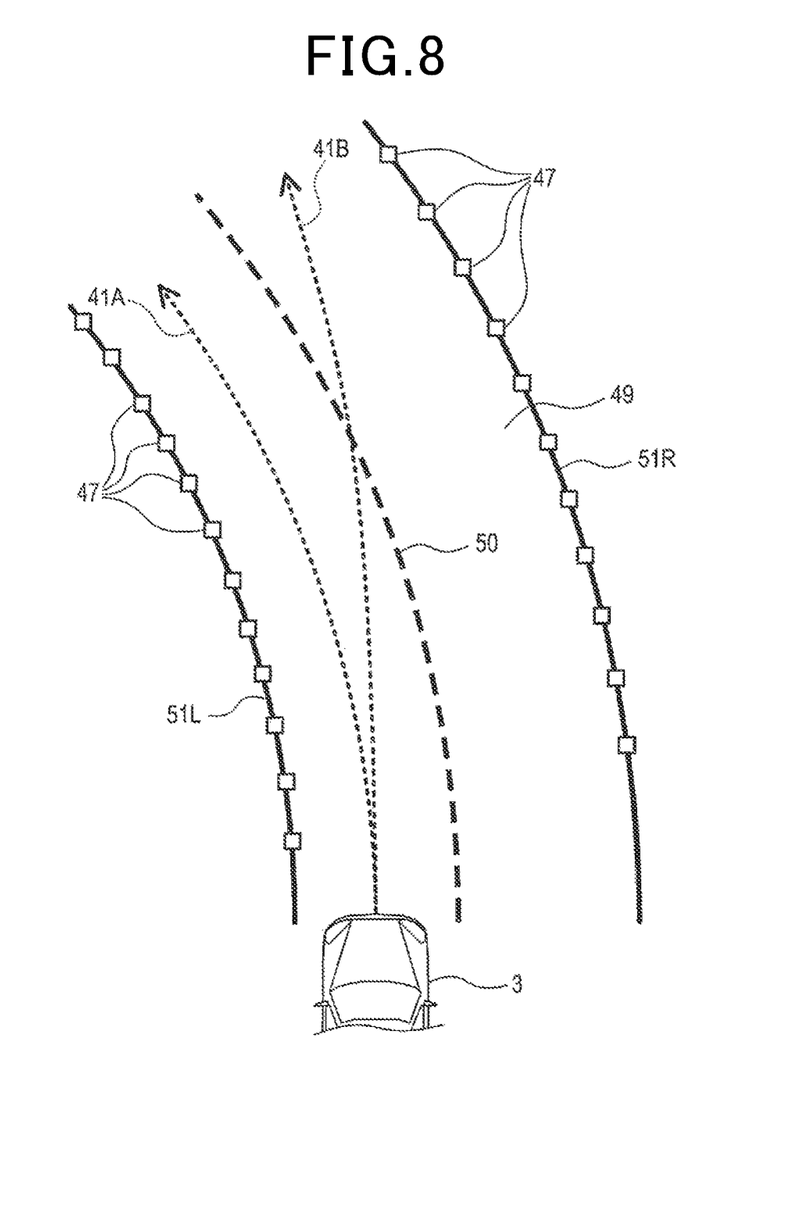
FIG. 8 is an explanatory diagram illustrating a traveling path that is along a shape of a road and a traveling path that is not along the shape of the road.

In the step S1, as in a traveling path 41A illustrated in FIG. 8, when the traveling path 41 that is along the shape of a road 49 is estimated, as illustrated in FIG. 6, the standard deviation of the histogram is low, whereby condition JB1 is easy to satisfy. In the step S1, as in a traveling path 41B illustrated in FIG. 8, when the traveling path 41 that is not along the shape of the road 49 is estimated, as illustrated in FIG. 7, the standard deviation of the histogram is high, whereby condition JB1 is difficult to satisfy. The traveling path 41B is, for example, the traveling path 41 in which the vehicle 3 traverses a traffic lane line 50 to perform lane change.

In step S10, the road boundary estimation unit 17 estimates road boundaries 51R, 51L illustrated in FIG. 5 based on the histogram. A method for estimating the road boundaries 51R, 51L will be described below.

As illustrated in FIG. 6, the histogram has two bins BR and BL having a maximum frequency. The BR is on the right side with respect to the traveling path 41. The lateral coordinate belonging to the bin BR corresponds to the lateral coordinate of a target present on the right side with respect to the traveling path 41. The right side is with reference to a driver facing the front of the vehicle 3. The left side is with reference to the driver facing the front of the vehicle 3.

The bin BL is on the left side with respect to the traveling path 41. The lateral coordinate belonging to the bin BL corresponds to the lateral coordinate of a target present on the left side with respect to the traveling path 41.

The road boundary 51R is on the right side with respect to the traveling path 41. An arbitrary point on the road boundary 51R is apart from the traveling path 41 by DR. DR is the absolute value of a medium value of the bin BR.

The road boundary 51L is on the left side with respect to the traveling path 41. An arbitrary point on the road boundary 51L is apart from the traveling path 41 by DL. DL is the absolute value of a medium value of the bin BL.

For example, it is assumed that the traveling path 41 estimated in the step 1 is an arc centering on the center point C and having a radius R. It is assumed that the traveling path 41 curves left from the driver's point of view. The road boundary 51R is an arc centering on the center point C and having a radius (R+DR). The road boundary 51L is an arc centering on the center point C and having a radius (R-DL).

Figure 4:
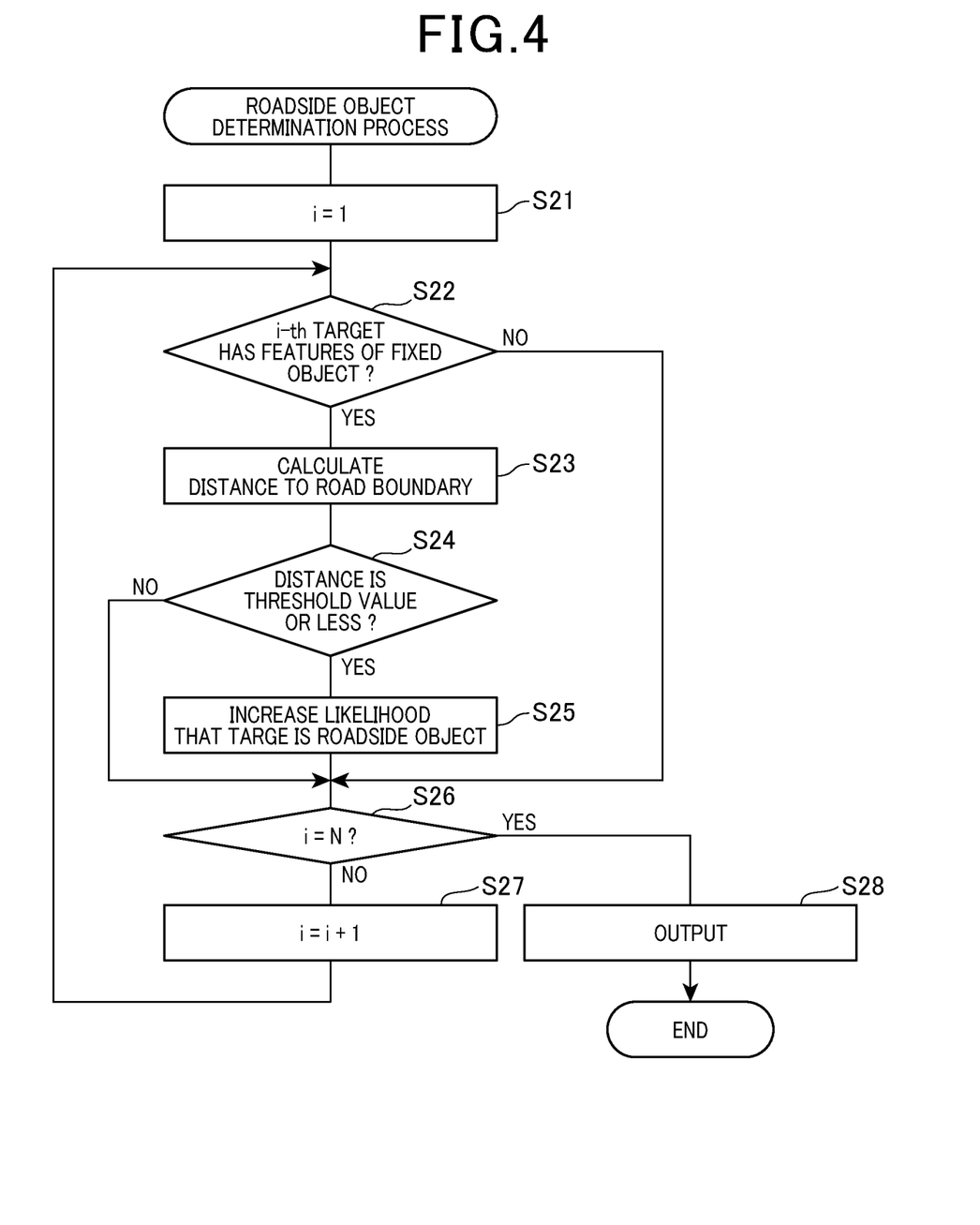
FIG. 4 is a flowchart of a roadside object determination process performed by the target recognition device.

In step S11, a roadside object determination process is performed. The roadside object determination process is illustrated in FIG. 4. In step S21 in FIG. 4, i, which is a number of a target, is initialize to 1.

In step S22, the fixed object determination unit 19 determines whether the i-th target has features of a fixed object. The fixed object is a target that does not move with respect to the road. A roadside object corresponds to the fixed object. Having features of a fixed object means satisfying all of the following conditions JC1 to JC3.

JC1: The size of the i-th target is a threshold value or smaller.

JC2: A cumulative travel distance of the i-th target is a threshold value or less.

JC3: The amount of change of a vertical location of the i-th target is a threshold value or less.

The cumulative travel distance is a distance in which the i-th target travels from the time at which the i-th target is detected for the first time to the current time. The target recognition device 1 performs tracking for the target in each cycle, which can associate the i-th target detected in the past cycle with the i-th target detected in the latest cycle. Hence, the target recognition device 1 can specify the location of the i-th target in the past cycle. The time at which the i-th target is detected for the first time is the time at which the i-th target is detected for the first time in the past cycle.

The vertical location is a relative location in the traveling direction of the road with reference to the location of the vehicle 3. If the i-th target is present ahead of the vehicle 3 and the distance between the i-th target and the vehicle 3 becomes longer, the amount of change of a vertical location is a positive value and increases with the passage of time. The amount of change of a vertical location is, for example, the amount of change between the vertical location at the time when the i-th target is detected for the first time and the vertical location at the current time.

When the i-th target has features of a fixed object, the present process proceeds to step S23. When the i-th target does not have features of a fixed object, the present process proceeds to step S26.

In step S23, the distance calculation unit 21 selects the road boundary closer to the i-th targe between the road boundaries 51R and 51L. Next, the distance calculation unit 21 calculates a distance from the i-th targe to the selected road boundary, more specifically, from a reference point of the i-th targe to the selected road boundary. The reference point is the center of an end portion of the i-th targe closer to the vehicle 3.

In step S24, the likelihood increasing unit 23 determines whether the distance calculated in the step S23 is a threshold value or less. The threshold value is, for example, 0.5 m. If the distance is the threshold value or less, the present process proceeds to step S25. If the distance exceeds the threshold value, the present process proceeds to step S26.

In step S25, the likelihood increasing unit 23 increases a likelihood that the i-th targe is a roadside object (hereinafter, referred to as a roadside object likelihood) so as to be greater than the roadside object likelihood at the current time. The roadside object likelihood is a likelihood that a target is a roadside object. The amount of increase in the roadside object likelihood can be appropriately set.

When the i-th targe is detected for the first time in the latest cycle or the roadside object likelihood of the i-th targe was not increased in the past cycle, the roadside object likelihood at the current time is a default value. The roadside object likelihood of the i-th targe was increased in the past cycle, the roadside object likelihood at the current time is a roadside object likelihood after the increase in the past cycle.

The target recognition device 1 performs tracking for the target in each cycle, which can associate the i-th target detected in the past cycle with the i-th target detected in the latest cycle. The target recognition device 1 can recognize how the roadside object likelihood of the i-th target changed in the past cycle.

In step S26, the target detection unit 11 determines whether the number i is equal to N. If the number i is less than N, the present process proceeds to step S27. If the number i is equal to N, the present process proceeds to step S28. The number i being equal to N means that the processing of the steps S22 to S25 is completed for all the targets detected in the processing of the step S2.

In step S27, the number i is incremented by 1. Then, the present process proceeds to step S22.

In step S28, the output unit 25 outputs the roadside object likelihoods regarding the respective N targets to the drive assist device 37. The drive assist device 37 can perform drive assist by using the roadside object likelihoods. For example, the drive assist device 37 prohibits steering in the direction to the target whose roadside object likelihoods is a threshold value or greater. In this case, the vehicle 3 can be prevented from being excessively close to the roadside object.

3. Effects Provided by Target Recognition Device 1

(1A) Even when the target recognition device 1 does not use two kinds of sensors, the target recognition device 1 can recognize a roadside object.

(1B) The target recognition device 1 estimates the road boundaries 51R, 51L on condition that the histogram satisfies conditions JB1 and JB2. Hence, the target recognition device 1 can correctly estimate the road boundaries 51R, 51L. The target recognition device 1 uses the correctly estimated road boundaries 51R, 51L to determine whether to increase the roadside object likelihood of the target. Hence, the target recognition device 1 can appropriately calculate the roadside object likelihood of the target.

(1C) The target recognition device 1 does not increase the roadside object likelihood of the target determined not to have features of a fixed object. Hence, the roadside object likelihood of the target that is not a fixed object can be prevented from being increased.

(1D) A plurality of roadside objects such as poles may be placed around a road boundary at regular intervals. Hereinafter, such a target is defined as a specified target. In conventional techniques, the specified target may be recognized as a target that is moving, due to aliasing or the like.

The specified target is close to the road boundaries 51R, 51L. Hence, if the specified target is the target i, a positive determination is made in the step S24, whereby the roadside object likelihood increases. Hence the target recognition device 1 can recognize the specified target as a roadside object.

(1E) A sidewall having low reflection intensity may be provided along a road boundary. In conventional techniques, it has been difficult to distinguish between such a sidewall and a vehicle traveling parallel to the vehicle 3 (hereinafter, referred to as a parallel travel vehicle). The sidewall is close to the road boundaries 51R, 51L.

Hence, when the sidewall is the target i, a positive determination is made in the step S24, whereby the roadside object likelihood increases. In contrast, the parallel travel vehicle is farther from the road boundaries 51R, 51L than the sidewall is. Hence, when the parallel travel vehicle is the target i, a negative determination is made in the step S24, whereby the roadside object likelihood does not increase. Thus, using the target recognition device 1 can distinguish between the sidewall and the parallel travel vehicle.

OTHER EMBODIMENTS

The present disclosure is not limited to the embodiments described above and may be variously modified.

(1) The target detection sensor 31 may be a sensor other than a radar sensor.

(2) The conditions used for determining whether to have features of a roadside object may be other than conditions JA1 to JA4. Not all of conditions JA1 to JA4 may be used, that is, part of conditions JA1 to JA4 may be used.

(3) The conditions used for determining whether to have features of a fixed object may be other than conditions JC1 to JC3. Not all of conditions JC1 to JC3 may be used, that is, part of conditions JC1 to JC3 may be used.

(4) Condition JB1 may be that an index other than the standard deviation is used as an index indicating an extent of a variation of the histogram.

(5) The target recognition device 1 and the method thereof disclosed in the present disclosure may be realized by a dedicated computer that is configured to include a memory and a processor programmed to execute one or a plurality of functions embodied by a computer program. Alternatively, the target recognition device 1 and the method thereof disclosed in the present disclosure may be realized by a dedicated computer configured to include a processor consisting of one or more dedicated hardware logic circuits. Alternatively, the target recognition device 1 and the method thereof disclosed in the present disclosure may be realized by one or more dedicated computers configured by a combination of a memory and a processor programmed to execute one or a plurality of functions, with a processor consisting of one or more hardware logic circuits. The computer program may be stored in a computer-readable non-transitory tangible storage medium as instructions executed by a computer. The method realizing functions of parts included in the target recognition device 1 may not necessarily include software. All the functions may be realized by one or a plurality of hardware components.

(6) A plurality of functions of a single component of the above embodiments may be realized by a plurality of components. One function of one component may be realized by a plurality of components. A plurality of functions of a plurality of components may be realized by a single component. One function realized by a plurality of components may be realized by a single component. Furthermore, part of the configuration of the above embodiments may be omitted. Furthermore, at least part of the configuration of the above embodiments may be added to or replaced by another part of the configuration of the embodiments.

(7) The present disclosure may be realized by, in addition to the target recognition device 1 described above, various forms such as a system including the target recognition device 1 as a component, a program for causing a computer to function as the target recognition device 1, a non-transitory tangible recording medium such as a semiconductor memory storing the program, a target recognition method, and a roadside object determination method.

An aspect of the present disclosure is a target recognition device (1) including: a traveling path estimation unit (9) configured to estimate a future traveling path (41) of a vehicle (3) based on a speed and a yaw rate of the vehicle; a target detection unit (11) configured to detect a target (47) present ahead of the vehicle by using a sensor (31); a roadside object determination unit (13) configured to determine whether the target detected by the target detection unit has a feature of a roadside object; a coordinate calculation unit (15) configured to calculate a coordinate in a lateral direction of the target determined to have the feature of the roadside object; a road boundary estimation unit (17) configured to estimate a road boundary (51R, 51L) based on the coordinate in the lateral direction; a fixed object determination unit (19) configured to determine whether the target detected by the target detection unit has a feature of a fixed object; a distance calculation unit (21) configured to calculate a distance from the target determined to have the feature of the fixed object to the road boundary estimated by the road boundary estimation unit; and a likelihood increasing unit (23) configured to increase a likelihood that the target is a roadside object, on condition that the distance is a preset threshold value or less.

Even when the target recognition device does not use both of two kinds of sensors, the target recognition device can recognize a roadside object.

What is claimed is:

1. A target recognition device, comprising one or more processors and memory storing a program, the one or more processors execute the program to perform operations comprising:

estimating a future traveling path of a vehicle based on a speed and a yaw rate of the vehicle;

detecting a target present ahead of the vehicle by using a sensor;

determining whether the detected target has a feature of a roadside object that is present in the vicinity of a road boundary and that is still;

calculating a coordinate in a lateral direction of the detected target determined to have the feature of the roadside object, the lateral direction being orthogonal to the traveling path;

estimating the road boundary based on the coordinate in the lateral direction that is orthogonal to the traveling path;

determining whether the detected target has a feature of a fixed object using a different method from a method used to determine whether the detected target has a feature of a roadside object;

calculating a distance in the lateral direction from the detected target determined to have the feature of the fixed object to the estimated road boundary; and increasing a likelihood that the detected target determined to have the feature of the fixed object is a roadside object, on condition that the distance is within a preset threshold value or less.

2. The target recognition device according to claim 1, wherein the operations further include preparing a histogram of the coordinate in the lateral direction, and, on condition that an extent of a variation of the histogram is a preset threshold value or less and a frequency of a bin having a maximum frequency is a preset threshold value or higher, estimates that the road boundary is present on the coordinate in the lateral direction belonging to the bin having the maximum frequency.

* * * * *